United States Patent

[11] 3,590,582

| [72] | Inventors | Dale F. German;<br>R. Stanford Short, both of Bryan, Ohio |
| --- | --- | --- |
| [21] | Appl. No. | 766,202 |
| [22] | Filed | Oct. 9, 1968 |
| [45] | Patented | July 6, 1971 |
| [73] | Assignee | The Aro Corporation<br>Bryan, Ohio |

[54] WORK CONTROL SYSTEM
20 Claims, 8 Drawing Figs.

[52] U.S. Cl. .................................................. 60/57, 91/35, 137/624.14, 137/624.18, 173/12
[51] Int. Cl. .................................................. B23q 5/06, F15b 21/10
[50] Field of Search .......................................... 91/35, 38; 173/12; 60/57

[56] References Cited
UNITED STATES PATENTS
| 3,195,655 | 7/1965 | Karden | 173/12 X |
| --- | --- | --- | --- |
| 3,434,547 | 3/1969 | Mitani et al. | 91/35 X |
| 3,439,754 | 4/1969 | Pantel | 173/12 |

Primary Examiner—Martin P. Schwadron
Attorney—Molinare, Allegretti, Newitt & Witcoff ABSTRACT: A device for controlling work output of pneumatic tools such as a wrench. The device includes a pair of pressure sensing valves and a pair of pneumatic timing devices which operate to control a three-way air supply valve in the air line to the tool. After the sensing valves sense the proper pressure sequence in the air line indicating application of a load to the tool, the three-way valve remains open for a preselected increment of time controlled by the first timer. Thus, the tool is driven for this preselected increment of time. The three-way valve is then closed, and the second timer insures that the three-way valve remains closed and the tool remains without power for a second preselected increment of time. The device automatically resets so that the sequence of operation may be repeated.

INVENTORS
DALE F. GERMAN
R STANFORD SHORT
by: Bair, Freeman & Molinare
ATTYS.

WORK CONTROL SYSTEM

BACKGROUND OF THE INVENTION

This invention relates to a work-control device for precisely controlling work output of fluid-driven apparatus and, more particularly, relates to a work-control device which may be positioned in the fluid power line between the fluid source and the fluid-driven apparatus to precisely control the amount of work output of the apparatus.

There are numerous applications wherein a fluid-driven tool is used to facilitate assembly of a machine or the like. For example, in the auto industry, impact wrenches and nut runners are used to tighten nuts and bolts during the assembly of an auto. There are numerous other instances, of course, where fluid-driven or air-driven tools are utilized for similar operations.

During such a manufacturing operation it is desirable to maintain quality control of the product by insuring that the various fasteners on the assembly are uniformly tightened. For example, the lug nuts holding an automobile wheel on a hub are preferably, uniformly tightened. Also, government regulations may require maintenance of specific ranges of tightness on fasteners. The federal auto safety regulations are an example of such regulations.

Continuing with the example of tightness of fasteners, a more precise definition of tightness is tension along the axis of the fastener. It is generally accepted that a fastener should be stressed 70 percent to 85 percent of its yield strength when assembled. However, to make axial stress measurements of a fastener in a completed assembly is a time-consuming and nearly impossible task.

Consequently, an alternative method of determining tightness has been practiced–torque measurement. Torque is the turning effort of a force applied to a lever arm. Its magnitude is the product of the force and the length of the lever. Torque is correlated with tension in any screw thread system. Thus when torque is applied to a screw, for example, an axial force results in the screw. The magnitude of this axial force is a function, inter alia, of the mechanical advantage of the screw threads. The axial force produces tensile or compressive stresses within the screw.

Unfortunately there are numerous factors which may alter the relationship of torque to tension under actual assembly conditions. This comes about because torque is primarily a measure of friction between the surfaces of the fastener and the assembly being fastened. Factors which influence frictional characteristics include the materials utilized, surface roughness, lubrication, etc. It has been determined that as much as 90 percent of the friction is the result of the surface conditions of the fastener head or nut and the surface against which they are driven.

Also variables such as alignment of parts are not the result of tension, but will alter the torque tension relationship. Torque thus is an indirect measurement of tension, dependent upon assembly conditions. Measurement of torque to determine tension is analogous to determining weight by measurement of dimensions. Finally, torque measurements are highly dependent upon the method of measurement and the skill of the technician making the measurement.

When a fastener is driven by a power tool, for example an impact wrench, another problem is introduced to torque measurement—dynamics. The speed which the fastener is driven must be considered in the assembly operation to insure that torque measurements are meaningful. Obviously a torque measurement in a static condition on a fastener is not an accurate measure of the torque delivered to the fastener by the tool. Stall-type tools minimize this condition. Nevertheless, tension control of fasteners by means of torque measurement or control is a pronounced problem with many air tools.

In summary, manufacture of assemblies using currently known tension or torque control methods and devices is not satisfactory because the methods of control and measurement based upon torque measurements are not reproducible. The present invention provides a means to control work input for a fluid driven tool and thus provides means to control, for example, fastener tension. To accomplish this, an entirely new concept, namely the concept of work control for fluid-driven tools is utilized.

Since the work a tool imparts, for example, to a fastener, equals the product of torque and the amount of rotation; and since the torque and speed characteristics are inherent and substantially invariable in each tool, the amount of work and therefore the tension in the fastener is a substantially invariable and a direct function of time. Theoretically, then, if the only variable is time, accurate tension, work and torque control is possible by controlling the time of tool operation. This principle is the theoretical basis of the present invention. The subject matter of the present invention transforms this theoretical principle into an operable device thereby eliminating control problems heretofore encountered.

SUMMARY OF THE INVENTION

In a principle aspect the present invention of a work-control device for controlling work output of fluid-driven apparatus comprises a device in the fluid supply line between the fluid source and the fluid-driven apparatus which includes valve means in the line capable of shutting off the flow of fluid to the fluid-driven apparatus in response to control means monitoring fluid flow pressure in the line. The control means associated with the valve means are adapted to sense fluid pressure in the line leading from the fluid power source to the fluid-driven apparatus and respond logically to these fluid flow pressures in that line to control fluid supply and thereby work output of the fluid-driven apparatus. Thus, the control means actuate the valve means to provide fluid to the driven apparatus for a measured increment of time so that a measured amount of work is performed by the driven apparatus.

It is thus an object of the present invention to provide a work-control device for controlling work output of fluid-driven apparatus.

It is a further object of the present invention to provide a work-control device which may be positioned in a fluid power line to control the fluid-driven apparatus without the necessity of external monitoring controls.

Still another object of the present invention is to provide a work-control device for fluid-driven apparatus which is adjustable.

One further object of the present invention is to provide a work-control device for fluid-driven apparatus which is economic to manufacture, easy to install, easy to service, and easy to adjust.

Still another object of the present invention is to provide a work-control device in which the amount of work performed by the controlled fluid-driven apparatus may be adjusted for various load conditions while maintaining maximum stability of the operating characteristics of the apparatus.

These and other objects, advantages and features of the invention will be set forth in greater detail below.

BRIEF DESCRIPTION OF THE DRAWINGS

In the detailed description which follows reference will be made to the drawings comprised of the following FIGS.

DESCRIPTION OF THE PREFERRED EMBODIMENT

Figure 1:
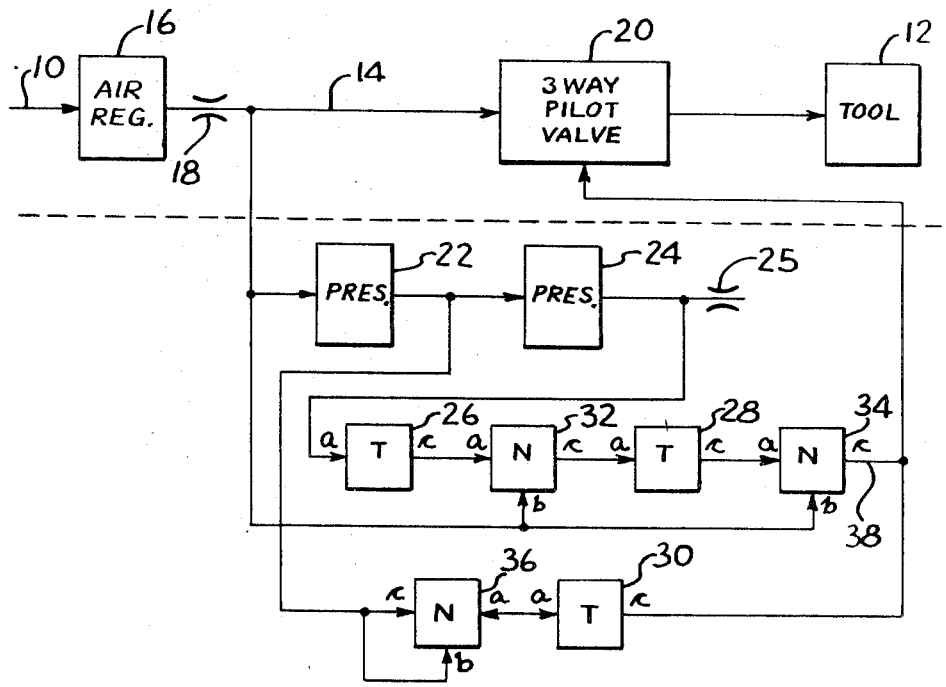
FIG. 1 is a schematic diagram of a first embodiment of the invention utilizing control means that respond to absolute pressure measurements.

Referring now to FIG. 1 there is shown a first embodiment of the work-control device of the present invention. While the following description is directed to pneumatic devices and describes their use in fastener operations, it is contemplated that any fluid-operated device used to perform any type of work is within the meaning and scope of the claims.

In the system shown in FIG. 1 there are two sections of the system. The first section includes an air line conduit 14 which interconnects the source 10 to the tool 12. Included in the conduit or line 14 is an air regulator 16 and a fluid restrictor 18. The restrictor 18 may be, for example, an ordinary gate valve. Downstream from the restrictor 18 is a three-way pilot-operated valve 20. Air or fluid for operating the tool 12 must pass through the regulator 16, restrictor 18, and valve 20 before it reaches and drives the tool 12.

The second part of the work-control device is the control means. The control means in FIG. 1 comprises the remainder of the device schematically represented but not previously described. The control means interconnects the conduit 14 and the pilot valve 20, monitors the pressure in the line 14 and logically responds to changes in that pressure by operating the pilot valve 20. The control means insures that power fluid flow is provided to the tool 12 for precise increments of time. By so controlling the amount of fluid to drive the tool 12, the amount of work which the tool 12 performs and therefore imparts to, for example a fastener, is also controlled. Thus, the tension on a fastener is precisely controlled.

The control means includes a first pressure sensor 22 and a second pressure sensor 24. The construction of the first and second pressure sensors 22 and 24 is described below. It suffices for the present to say that the function of the first sensor 22 is to open a path of control fluid flow through that sensor 22 whenever pressure in the conduit 14 falls below a predetermined upper limit as indicated by the point, A, in FIG. 2. This, of course, provides fluid to the second sensor 24. The second sensor permits fluid to flow therethrough whenever line pressure through sensor 22 is greater than minimum value but, of course, less than the upper limit through sensor 22.

The remaining components in the control means of FIG. 1 include first, second and third timing means 26, 28 and 30 respectively. These timers are all of a similar construction and have an internal chamber into which fluid flows through a variable orifice. The orifice may be adjusted to precisely control the time required to fill the chamber. In FIG. 1 the orifice inlet is indicated by the letter $a$ and the outlet by the letter $c$.

Figure 5:
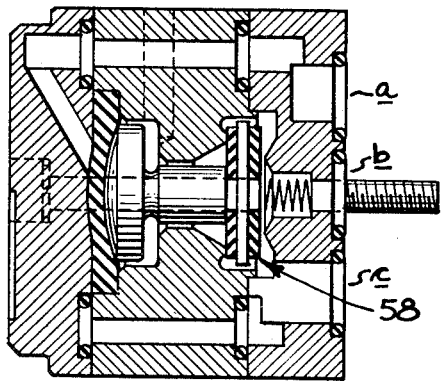
FIG. 5 is a cross-sectional view of a typical NOT element utilized in the systems shown in FIGS. 1 and 3.
Figure 6:
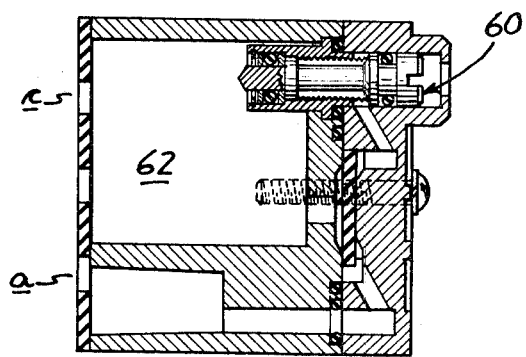
FIG. 6 is a cross-sectional view of a typical timing element utilized in the system shown in FIGS. 1 and 3.

Also included in the control means are first, second and third NOT elements 32, 34 and 36, respectively. These elements provide an output signal whenever there is $not$ an input signal. In FIG. 1 the input to the NOT elements is indicated by the letter $a$ and the output by the letter $c$. The letter $b$ indicates a fluid supply input to the NOT element. When the NOT element is closed, in other words when fluid flows through input $a$, the fluid output $c$ is vented to the atmosphere. Embodiments of these components are illustrated in FIGS. 5 and 6 and are described below in greater detail.

Figure 2:
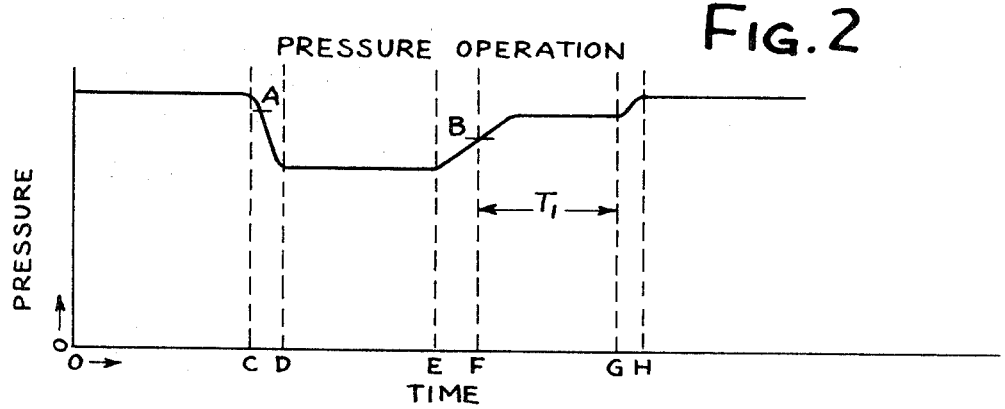
FIG. 2 is a graph representing the fluctuation of fluid pressure with time for an arrangement of the type shown in FIG. 1.

Referring now to FIG. 2 there is shown a graph representing the pressure in the fluid power conduit 14 as it varies with time when the power tool 12 is being used. From time 0 to time C the tool is in an off position. In other words, the tool 12 has a trigger or other mechanism for turning it on. From time 0 to time C this trigger is not actuated. The pressure on the graph then represents the full line pressure available to the tool 12.

At time C the air tool is turned on at tool 12. There is initially a pressure drop in the line due to the passage of fluid through the power tool to operate the tool. This pressure drop occurs over the time period C to D and is almost instantaneous. This first pressure drop is sensed by the first pressure sensor 22 at the pressure indicated on the graph by the point A. When the pressure drops to the point indicated at A, the sensor valve 22 opens and fluid flows therethrough as described before. The point A is less than the line pressure during the off condition of the tool 12 but greater than the pressure observed in the line during a working operation as will be described.

During the time increment D to E the tool is running free. For example, an impact wrench is running a nut on a bolt against substantially no resistance. The nut is not yet being tightened and very little or negligible work is being performed on the system.

Next, during the time increment E to F the line pressure increases as indicated on the graph of FIG. 2. This pressure increase results when the tool 12 begins to meet resistance of the fastener or the like which is being operated upon by the tool 12. At a point indicated by the letter B along the pressure curve for the particular tool, the second sensor valve 24 is activated and permits fluid to flow therethrough. Thus, both the first sensor 22 and the second sensor 24 are activated following the sequence of pressures over the time increment O—F.

At the time indicated by the letter F, the remainder of the control means, namely, the timing and NOT devices operate to control the work performed by the tool 12. Obviously the NOT devices 32 and 34 are provided with a fluid supply and are operative immediately upon supply of fluid through the valve 18.

During the time increment F to G the tool remains running under load as the control means insures that the normally open three-way pilot valve 20 will remain open for a specific predetermined time increment, F—G. The control means then causes the normally open three-way pilot valve 20 to close thereby shutting the power tool 12 off. This causes the pressure in line 14 to return to its initial value. The control means, after predetermined delay in the off position resets itself. Delivery of fluid flow to the tool 12 may then be effected for another increment of time. The reset operation and dwell time operation are described below.

The timing devices and NOTS cooperate to control the increments of time during which the tool is operative or nonoperative. Thus, after the tool 12 is turned on the pilot valve 20, which is open, permits airflow through the tool 12 as described above. The air pressure in line 14 then passes through the sequence of pressures described above until the tool starts to meet resistance when tightening up a fastener as indicated by time increment E—F in FIG. 2. This, of course, actuates both of the pressure sensors 22 and 24.

A pressure signal is thus applied to the $a$ or input port of the first timer 26. After a predetermined increment of time, as determined by the variable orifice adjustment on the timer 26, a sufficient pressure signal from timer 26 passes to input $a$ of the first NOT device 32. Consequently the fluid pressure signal passing from port $b$ through port $c$ of the NOT 32 is terminated. This causes timer 28 to exhaust to the atmosphere through port $c$ of NOT 32 thereby eliminating the input $a$ to the second NOT 34 and causing a pressure signal to pass from port $b$ through port $c$ of NOT 34. Consequently a pressure signal is applied by second NOT 34 through a control conduit 38 to the three-way pilot valve 20. The three-way pilot valve 20 shuts off air to the tool 12 thus stopping the tool 12. The amount of work applied to the fastener is thus controlled by the time adjustment of the first timer 26.

After the power to the tool is shut off, the above-described device automatically resets. Successful reset is accomplished in conjunction with the closing of pressure sensor 22. When valve 20 is closed by the signal supplied through conduit 38, the fluid flow is terminated and the pressure supplied to sensor 22 becomes line pressure (the effect of an exhaust orifice 25 described below, is inconsequential). The recovery of this pressure level causes sensor 22 to close and terminate the air supply to sensor 24 and timer 26. Exhaust of the control means follows. When the pressure signal was applied to the three-way pilot valve 20 through conduit 38, a pressure signal also passed through the timer 30 to the input a of the third NOT device 36. This NOT 36 is an exhaust gate which exhausts the pressure signal from the first and second pressure sensors 22 and 24. Thus, when fluid pressure acts on the input a of NOT 36 pressure from the sensors 22 and 24 passes through the exhaust output c of NOT 36 and vents to the atmosphere. Also functioning as exhaust means is a bleed exhaust orifice 25 which permits the timer 26 to exhaust when sensor 24 is closed. Orifice 25 is small with a flow rate that will not affect the control means when sensor 24 is open. It should be noted that an exhaust orifice provided between sensors 22 and 24 eliminates the need for the NOT 36 exhaust gate and timer 30. Moreover if sensors 22 and 24 were three-way functioning elements, the necessity for exhaust orifice means as at 25 would be eliminated.

Exhausting the first timer 26 causes actuation of the first NOT 32. The first NOT 32 then applies a pressure signal to the second timer 28 which after a predetermined increment of time activates the second NOT 34. When the second NOT 34 is activated the pressure signal to the three-way pilot valve 20 ceases. NOT 34, in fact, exhausts line 38 causing the valve 20 to open thereby permitting airflow through the line 14 to the tool 12. Thus, the tool 12 remains off until valve 20 is opened even though the trigger on the tool 12 is held in an open position.

When the three-way pilot valve 20 is opened by exhaustion of line 38 through NOT 34 after the dwell increment of time, the third timer 30 permits the pressure signal to the a port of NOT 36 to decay and exhaust through line 38 and NOT 34. NOT 36 thus ceases to exhaust the sensors 22 and 24. Thus, then the three-way pilot valve 20 opens the fluid line from the valve 20 to the tool 12 causing that line to be pressurized, the first and second valves 22 and 24 are deactivated. It is apparent then that operation of the exhaust means is independent of pressures upstream from the valve 20 but dependent upon the event of opening or closing the valve 20. This completes the cycle of operation of the absolute pressure control means system for a fluid-driven apparatus.

Figure 3:
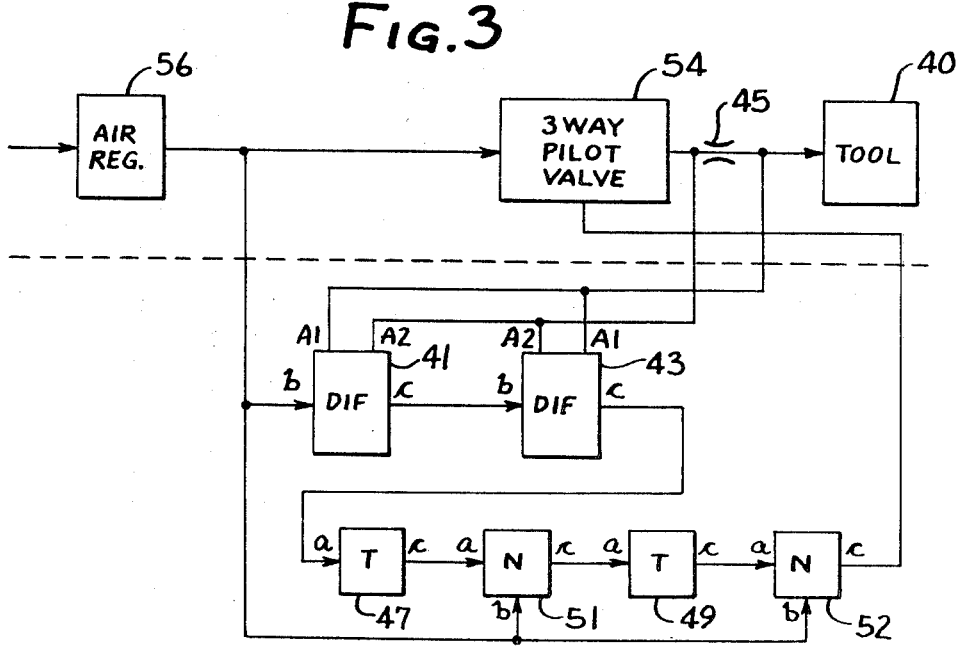
FIG. 3 is a schematic diagram of a second embodiment of the invention utilizing control means that respond to differential pressure measurements.

A second embodiment of the invention is illustrated in FIG. 3. This embodiment is described in conjunction with the graph of FIG. 4. First, by referring to FIG. 4, it can be seen that this Figure is representative of the pressure differential across a restriction in the supply line to an operating air tool.

The embodiment of FIG. 3 also includes a regulator 56, an adjustable restrictor 45, a three-way pilot valve 54 and a tool 40 in addition to first and second timers 47 and 49 and first and second NOTS 51 and 52. In the system illustrated in FIG. 3 the placement of sensors 41 and 43, on a functional basis, has been reversed from that of the sensors 22 and 24 in FIG. 1. Thus, sensor 41 remains closed until measured pressured differential across the adjustable restrictor 45 increases above a predetermined adjusted value indicated by the letter N1 in FIG. 4. This is is the same type of function as the sensor 24 in FIG. 1 which remains closed until pressure rises above a minimum level. Sensor 43 may be compared in the same manner with sensor 22. That is, they both perform the same function of remaining closed until the sensed pressure or pressure differential drops below a certain level. That level is indicated by the points M1 and M2 in FIG. 4 for sensor 43.

In reality, the pressure differential sensors 41 and 43 operate somewhat differently in response to pressure differential sensed across the restrictor 45. Thus sensor 41 is a normally closed valve which responds to a low differential indicated by N1 to remain open. Sensor 43 is a normally open valve and until a high-pressure differential is realized as at M1 whereupon sensor 43 closes until pressure differential M2 is sensed. The sensor 43 then opens. In practice the time increment between N1 and M1 is negligible and may be ignored for purposes of operation of the device of the invention.

Figure 4:
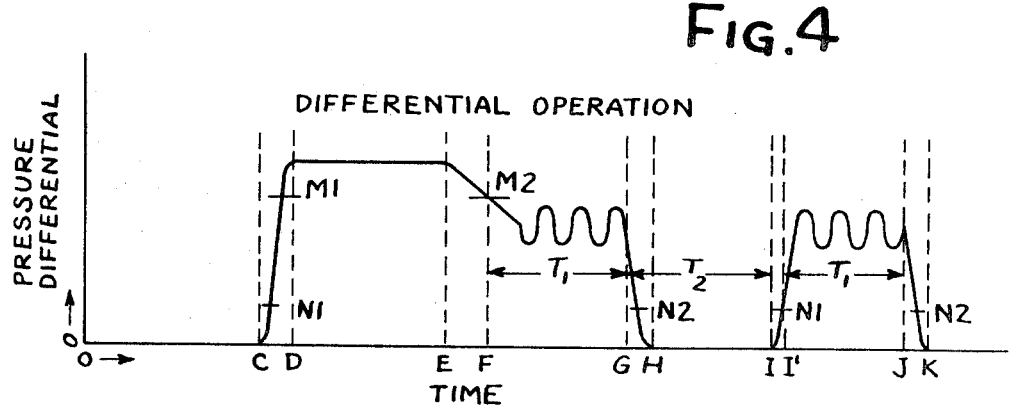
FIG. 4 is a graph representing the fluctuation of differential pressure with time for an arrangement of the type shown in FIG. 3.

The sequence of operation of the device in FIG. 3 is quite similar to that previously described for the embodiment of FIG. 1. For this reason the time axes of the graphs in FIGS. 2 and 4 representing the sequence of operation are arranged for easy comparison. Thus, after the time interval O—F when the first sensor 41 is activated at pressure N1, and the second sensor 43 is activated to close at pressure M1, and reverts to open at pressure M2, the first timer 47 is actuated. It should be noted that since the pressure differential through the first sensor 41 rises almost instantaneously, the second sensor 43 closes at differential M1 and remains in a closed position until the air tool 40 encounters resistance in its operation at pressure differential M2.

The second timer 49, the first NOT 51 and the second NOT 52 operate in the same manner as described previously for the absolute pressure control device in opening and closing three-way pilot valve 54. The regulator 56, of course, maintains the line pressure at substantially a constant value. Thus, after the first and second sensors 41 and 43 are actuated, an air input into the a side of timer 47 results in a sufficient output signal to NOT 51 after a preselected increment of time. This will, in turn, cause exhaustion of the second timer 49. An immediate signal is applied by the second NOT 52 from its output c to the three-way pilot valve 54 thereby closing off the air supply to tool 40.

When the air supply to the tool 40 has been cut off, of course, the pressure differential sensed by the first and second sensors 41 and 43 will return to zero and the sensors will shift to the off position. The first timer 47 will immediately exhaust through sensor 43 thus resulting in removal of the input signal through the a port to the first NOT 51. This in turn causes an output signal to the second timer 49 from the first NOT 51. After a preselected increment of time set on the second timer 49, a sufficient signal passes from the c port of the second timer 49 to the a port of the second NOT 52. This causes the output signal from the second NOT 52 to cease thereby opening the valve 54. The increment of time, $T_2$, on the second timer 49 is the dwell time or off time of the tool even if the trigger permitting air to the tool 40 remains on.

The function of the pressure differential system is the same as the function of the absolute pressure system except the combination timer 30 and NOT exhaust gate 36 and exhaust orifice 25 have been eliminated. This exhaust is not necessary because the differential sensors 41 and 43 operate as three-way valves including an exhaust; whereas, the absolute pressure sensors 22 and 24 operate as two way valves with no exhaust.

As may be appreciated by an examination of FIG. 4 the trigger to a tool 40 may remain on while the control part of the circuit operates for a first increment of time as determined by the first timer 47 and remains off for a second increment of time as determined by the second timer 49. Thus, by holding the trigger or switch on for a time increment O—K as illustrated in FIG. 4, the tool 40 will operate for periods $T_1$ (F—G and I'—J) and dwell or remain off for period $T_2$ (G—I). Such cycling will continue as long as the tool trigger remains on. Should the trigger to the tool 40 be switched to the off position at any time, the control circuit automatically provides for resetting of the device. The resetting and recycling operations are automatically provided for in both the absolute and differential pressure systems illustrated in FIGS. 1 and 3 respectively.

As illustrated in FIG. 4, sensor 41 closes at differential pressure $N_2$. However, since pressure to timer 52 is independent of the pressure signal to the sensors 41 and 43, the time increment $T_2$ is independent of the sensors 41 and 43. Also, when the trigger on tool 40 is maintained in an on position, time increment $T_1$ does not begin until point I', that differential pressure at which sensors 41 and 43 permit a signal to pass to timer 47. Obviously, point N1 indicates this differential pressure and the time increment I—I' represents the delay before timer 47 begins to receive a signal. In practice this time increment is inconsequential.

By means of this invention, a predetermined and fixed amount of work can be imparted to a device by an air-driven tool. The description has concentrated on the application of an amount of work in a single time increment, $T_1$. However any amount of work output by an air-driven tool may be controlled utilizing the device of the present invention. For example, a nut might require tightening provided by the tool operating for two periods, $T_1$. An operator will then merely count these periods, $t_1$, before tightening the next nut on the line. A single operating period $T_1$ or more than two may also be required. Of course, the length of the periods $T_1$ and $T_2$ are also adjustable. Thus, complete control of work on an assembly is not possible and accurate fabrication standards can be maintained.

In FIGS. 5, 6, 7 and 8 there are shown cross-sectional views of typical elements utilized in the construction of the devices described above. FIG. 5 illustrated a NOT element. This is a normally open, pilot-operated three-way valve. The $b$ port is the input, the $c$ port is the output and the $a$ is the pilot. A pressure signal applied to the $a$ port closes the valve 58 over the $b$ port, thus interrupting the flow of air to the $c$ port. When the pressure signal to the $a$ port is relieved, flow from the $b$ to $c$ ports is resumed. Pressure at the $c$ port is vented or exhausted when the $a$ port is closed. Thus, when a signal is applied to the pilot $a$ air does not flow through the element. This NOT is typical of those devices adapted to provide the proper logic function. It is the subject matter of U.S. Pat. No. 3,389,720 issued June 25, 1968.

FIG. 6 illustrates a timing element. This unit includes a needle valve or variable orifice means 60 leading into an accumulator cavity 62. The signal to be timed is supplied to the $a$ port. The signal flow rate is controlled by the adjustment of the needle valve 60 to establish the time required to pressurize the accumulator cavity 62. The signal is thus delayed by the time required to develop a sufficient pressure in the cavity 62 to actuate the next element in the circuit even though pressure is being provided to the next element. The next element in the present application is a NOT device. This timer is typical of those devices adapted to provide the proper timing function. It is the subject matter of U.S. Pat. application, Ser. No. 563,744 filed July 8, 1966, now U.S. Pat. No. 3,466,004.

Figure 7:
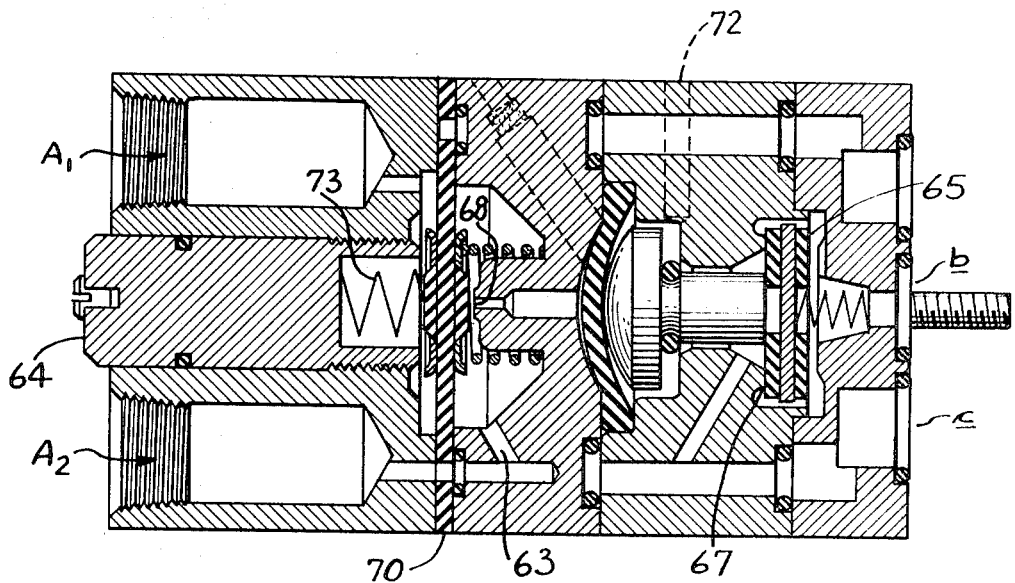
FIG. 7 is a cross-sectional view of a pressure sensor of the type used in the system shown in FIG. 3.

FIG. 7 illustrates a construction for the first sensor 41 for a pressure differential system. Such a sensor is described in the application of German for a Pressure Differential Sensor Valve Assembly, Ser. No. 717,137 filed Mar. 29, 1968, now U.S. Pat. No. 3,521,850. The sensor consists of a three-way, normally closed pilot-operated valve with the pilot input signal being supplied by a pressure differential valve. The unit senses the differential pressure supplied across $A_1$ and $A_2$ ports of the elements.

The pressure differential at which the sensor responds is adjustable by the adjustment screw 64. The adjustment actually establishes an axial spring balance on diaphragm 70 which is altered by the pressure differential across ports $A_1$ and $A_2$ acting upon the diaphragm 70. At sufficient pressure differential, the diaphragm 70 is biased away from orifice 68, and the pressure from the $A_2$ port provides a signal through passage 63 and orifice 68 which drives the valve 65 from seat 67.

Thus, the upstream or higher pressure level is supplied to the lower side of the diaphragm 70 through the port $A_1$ while the downstream or lower pressure is supplied by port $A_2$ to the upper side of the diaphragm 70. The sensor is adjusted so that the diaphragm 70 is normally seated against orifice 68. An input through the port $b$ is normally unable to pass through the output port $c$. When however the pressure differential increases above a predetermined set level, the diaphragm 70 rises from the orifice 68 which, as described above, causes the valve 65 to open. This permits a signal to flow from port $b$ to port $c$ of the sensor. A vent 72 permits port $c$ to exhaust when valve 65 is seated on seat 67.

Figure 8:
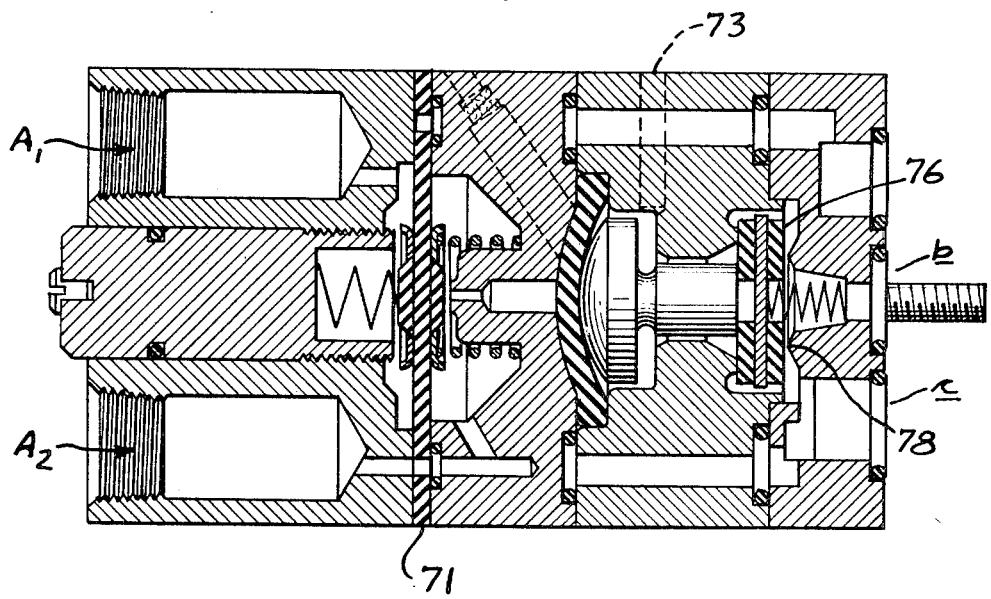
FIG. 8 is a cross-sectional view of a second pressure sensor of the type used in the system shown in FIG. 3.

FIG. 8 illustrates a typical configuration of the second sensor 43 in FIG. 3. This differs from the sensor previously described in that it is a pilot-operated normally open valve rather than a pilot-operated normally closed valve. Construction and adjustment is the same as previously described for the sensor illustrated in FIG. 7 except that air flows from port $b$ to port $c$ when no pressure differential signal exists. When a pressure differential signal is encountered which operates to move the diaphragm 71, the valve 76 seals against the seat 78 and closes the fluid flow path from ports $b$ to $c$. This element also includes a vent 73 so that when a signal is supplied to activate valve 76 the system may exhaust through the port $c$.

The curves illustrated in FIGS. 2 and 4 are merely illustrative of those types of curves which may be expected when utilizing an air tool as impact wrench for tightening a nut. Such pressure curves vary with each tool. Thus, there are a number of settings which must be determined with each application of the device of the present invention. These include the setting of the regulator supplying air to the power tool, the pressure drop through the restrictor or gate valve, the first and second sensing pressures which will activate the first and second sensors or valves, and the first and second increments of time $T_1$ and $T_2$ which represent respectively the period of time during which the tool performs work and the dwell time of the tool when the tool is turned off.

All of these factors are, to a certain extend, empirically dependent upon the materials which are being utilized. Thus, a self-tapping screw being inserted into a thick material will have different characteristics than locknuts or sheet metal screws being inserted in various materials. The effect of these materials and the settings required to best perform on a work operation are a matter of experimental analysis for each particular operation. However, once settings have been determined for a particular assembly operation, for example, tightening of lug nuts on wheels, the operation is repeatable without making any adjustments to the device and with highly accurate reproducibility in results. Thus, the tension on the lug nuts, for example, can be maintained within critical limits to a very close degree.

The device has numerous benefits. The unit controls the work performed by the tool. It relieves the operator of the responsibility for control of his operation. It establishes a time control for a particular job and thereby results in time savings. It controls the tool without adding control devices to the tool itself thereby keeping the weight of the tool to a minimum. It adapts to existing tools without the requirement of any change in the construction and operation of existing tools. It controls impact or stall-type tools of various sizes. Finally, it lengthens the life of the tools and minimizes tool maintenance by eliminating needless tool abuse. The device will work with hard assemblies such as the lugs on an auto wheel, soft assemblies such as assemblies incorporating gaskets, springs or the like or intermediate assemblies which possess hard and soft characteristics in varying degrees.

We claim:

1. A work-control device for controlling work output of fluid driven apparatus comprising, in combination:
    a fluid inlet from a fluid source;
    a fluid outlet to said fluid-driven apparatus;
    fluid flow conduit means between said inlet and outlet;
    valve means in said conduit means for stopping fluid flow therethrough; and
    control means for said valve means, said control means logically responsive to change in fluid pressures in said conduit means and thus logically responsive to change in fluid consumption of said driven apparatus, said control means including first means to sense free-running operation of said fluid-driven apparatus and second means to subsequently sense non-free-running operation of said fluid-driven apparatus due to increased resistance to the operation being performed by said fluid-driven apparatus, said control means also including means to maintain said valve means open for a measurement increment of time in response to non-free-running operation as sensed by said second means.

2. The work control device of claim 1 wherein said control means includes means responsive to absolute pressures in said conduit means.

3. The work control device of claim 2 wherein said means logically responsive to absolute pressures is adjustable.

4. The work-control device of claim 1 including means for effecting a pressure drop between said inlet and said outlet and wherein said control means is operative to sense the operation of said driven apparatus by sensing said pressure drop.

5. The work control device of claim 1 wherein said means for effecting pressure drop is adjustable.

6. The work control device of claim 1 wherein said control means includes means for resetting said work-control device subsequent to said measured increment of time.

7. The work-control device of claim 6 wherein said means for resetting includes second timing means responsive to said control means, said second timing means operative to provide a dwell increment of time during which said driven apparatus is not provided with fluid from said fluid flow source.

8. The work-control device of claim 1 wherein said control means includes means for adjusting said measured increment of time.

9. The work-control device of claim 1 including fluid flow regulator means in said conduit means intermediate said inlet and said valve means.

10. A work-control device for controlling work output of fluid-driven apparatus comprising, in combination:
  a fluid conduit having an inlet and an outlet, said inlet being connectable to a fluid source and said outlet being connectable to said fluid-driven apparatus;
  restrictor means in said conduit intermediate said inlet and said outlet;
  a valve in said conduit intermediate said inlet and said outlet;
  control means for said valve including first pressure sensor means for sensing a first absolute pressure in said conduit downstream of said restrictor and providing a signal, said first absolute pressure being less than line pressure to said apparatus; second pressure sensor means for sensing a second absolute pressure following said signal of said first sensor means and providing a second signal, said second absolute pressure being less than said first pressure and greater than pressure to said apparatus when said apparatus is operating without load, and first timing means actuated by said signal of second sensor means sensing said second absolute pressure, said first timing means operative to actuate said valve to said apparatus following a first increment of time.

11. The device of claim 10 wherein said first timing means closes said valve following said first increment of time.

12. The control device of claim 10 wherein said control means includes second timing means operative to deactuate said valve following a second predetermined increment of time after said first increment of time.

13. The work-control device of claim 10 wherein said control means includes reset means to recycle said control device for another first increment of time during which said apparatus is operative.

14. The work-control device of claim 10 including regulator means in said fluid conduit.

15. A work-control device for controlling work output of fluid-driven apparatus comprising, in combination:
  a fluid conduit having an inlet and an outlet, said inlet being connectable to a fluid source and said outlet being connectable to said fluid-driven apparatus;
  restrictor means in said conduit between said inlet and said outlet;
  a valve in said conduit intermediate said inlet and said outlet; and
  control means for said valve comprising first pressure-differential-sensing means for sensing pressure differential in said conduit across said restrictor and providing a signal whenever said pressure differential exists, second pressure-differential-sensing means for sensing pressure differential in said conduit across said restrictor and providing a signal when said first pressure-differential-sensing means provides a signal and said pressure differential is less than the difference between said line pressure and pressure in said line when said fluid-driven apparatus is operated under no load, first timing means for actuating said valve following a first increment of time whenever said second pressure-differential-sensing means provides a signal to said first timing means.

16. The device of claim 15 wherein said first timing means closes said valve following said first increment of time.

17. The work control device of claim 15 wherein said control means includes second timing means operable to deactuate said valve a second increment of time following said first increment of time.

18. The work-control device of claim 17 wherein said second timing means is adjustable.

19. The work-control device of claim 15 wherein said first timing means is adjustable.

20. The work-control device of claim 15 including a regulator in said fluid conduit.